United States Patent

Mörz et al.

[11] Patent Number: 4,473,828
[45] Date of Patent: Sep. 25, 1984

[54] MICROWAVE TRANSMISSION DEVICE WITH MULTIMODE DIVERSITY COMBINED RECEPTION

[75] Inventors: Günter Mörz, Ludwigsburg; Klaus Rademacher, Backnang, both of Fed. Rep. of Germany

[73] Assignee: Licentia Patent-Verwaltungs-GmbH, Frankfurt am Main, Fed. Rep. of Germany

[21] Appl. No.: 361,451

[22] Filed: Mar. 24, 1982

[30] Foreign Application Priority Data

Mar. 25, 1981 [DE] Fed. Rep. of Germany ....... 3111731

[51] Int. Cl.³ .......................................... H01Q 13/00
[52] U.S. Cl. .................................... 343/786; 333/137; 455/52; 455/81
[58] Field of Search ...................... 343/786, 368-372; 333/137; 455/52, 81

[56] References Cited

U.S. PATENT DOCUMENTS 4,420,756 12/1983 Hamada .............................. 343/786

Primary Examiner—Eli Lieberman
Attorney, Agent, or Firm—Spencer & Frank

[57] ABSTRACT

A microwave transmission system for multipath propagation operating according to the angle diversity principle and comprising a transmitting and receiving device including a reflector antenna and a waveguide exciter horn wherein a fundamental mode and modes of a higher order can propagate, a mode coupler following the exciter horn for separating the energy components of the main mode and the higher order modes, and receiving and combining devices for obtaining the best signal from the received energy components of the various modes. The exciter horn is dimensioned so that at least two independent modes of a higher order or combinations thereof having the same polarization as the main mode can be excited in the waveguide exciter horn in addition to the main mode. In order to enlarge the radiation gain of the antenna, the waveguide exciter horn is designed, in its basic structure as well as by means of additional structural elements, such as pairs of apertures, corrugated structures, steps and bends, such that the aperture angle ($\alpha$) of the radiation lobe of the main mode is matched to the aperture angle ($\beta$) of the radiation lobes of the higher modes or vice versa in the plane of the electrical field as well as in the plane of the magnetic field. The mode coupler feeds more than two mutually independent received signals from the received energy components of the different modes separately to the receiving and combining devices, and includes a transmitting port which excites one mode whose preferred field direction is orthogonal to the preferred field direction of the received main mode.

7 Claims, 15 Drawing Figures

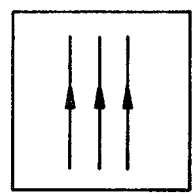
$H_{10}$-MODE
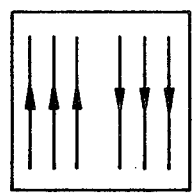
$H_{20}$-MODE
FIG.2a
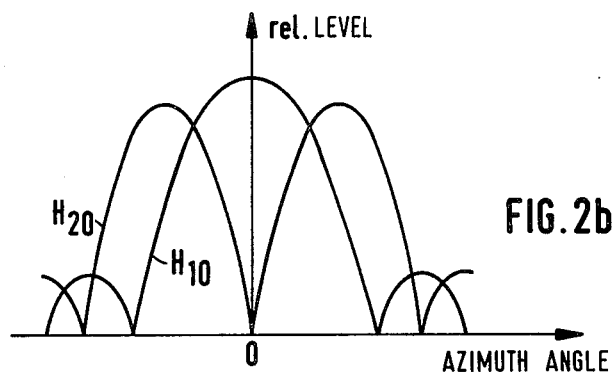
FIG.2b
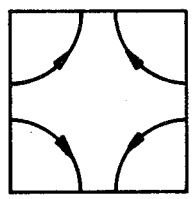
$H_{11}$-MODE
+
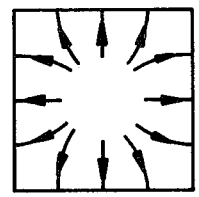
$E_{11}$-MODE
=
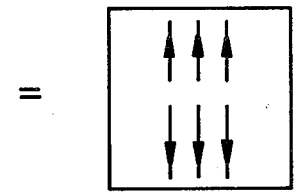
$(H_{11}+E_{11})$-MODE
FIG.2c
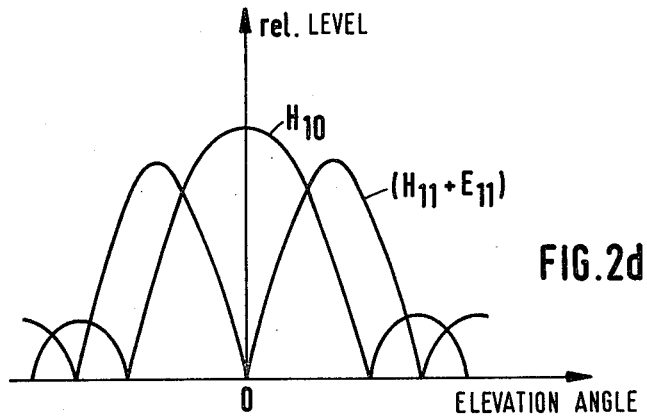
FIG.2d

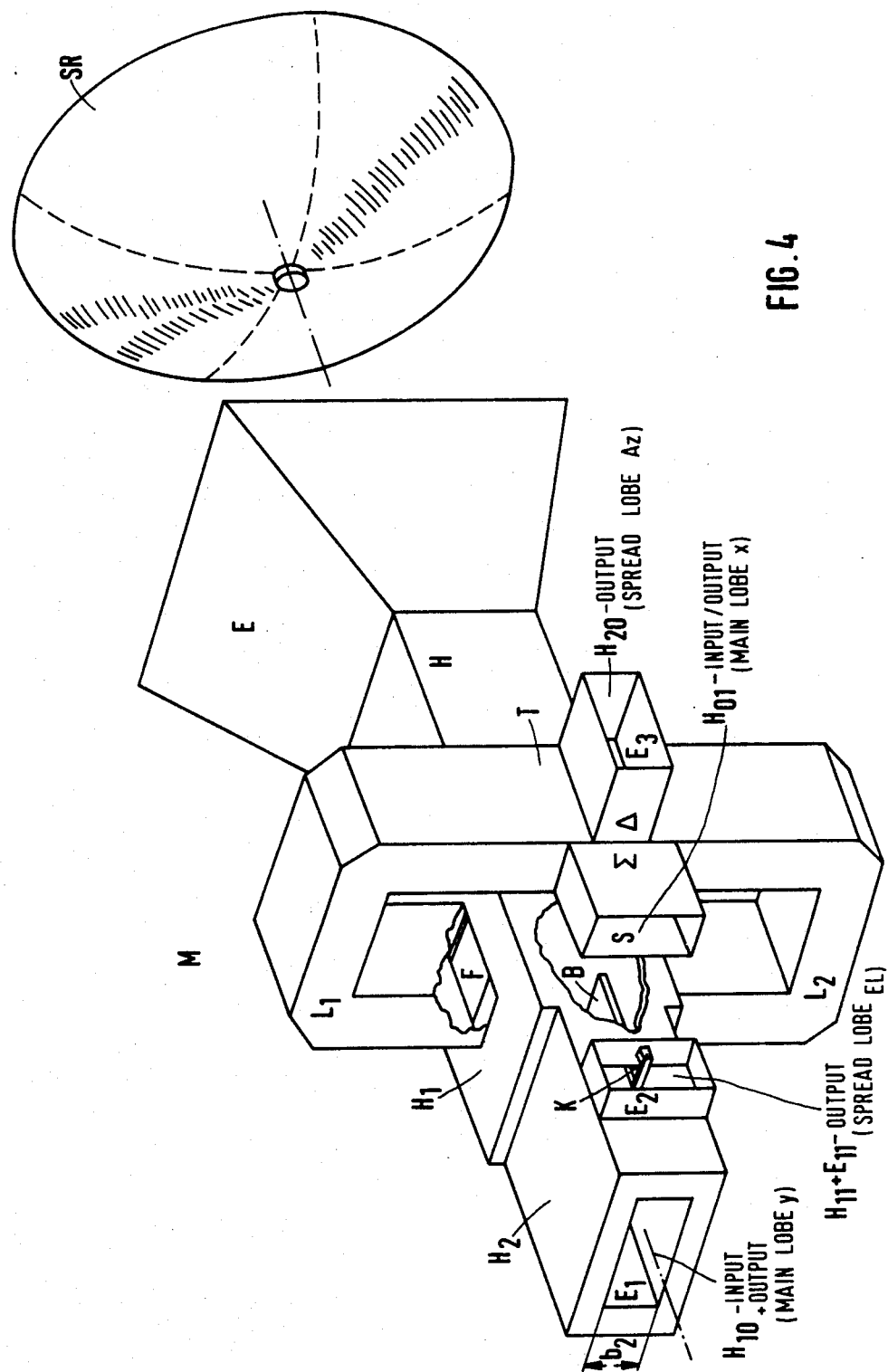

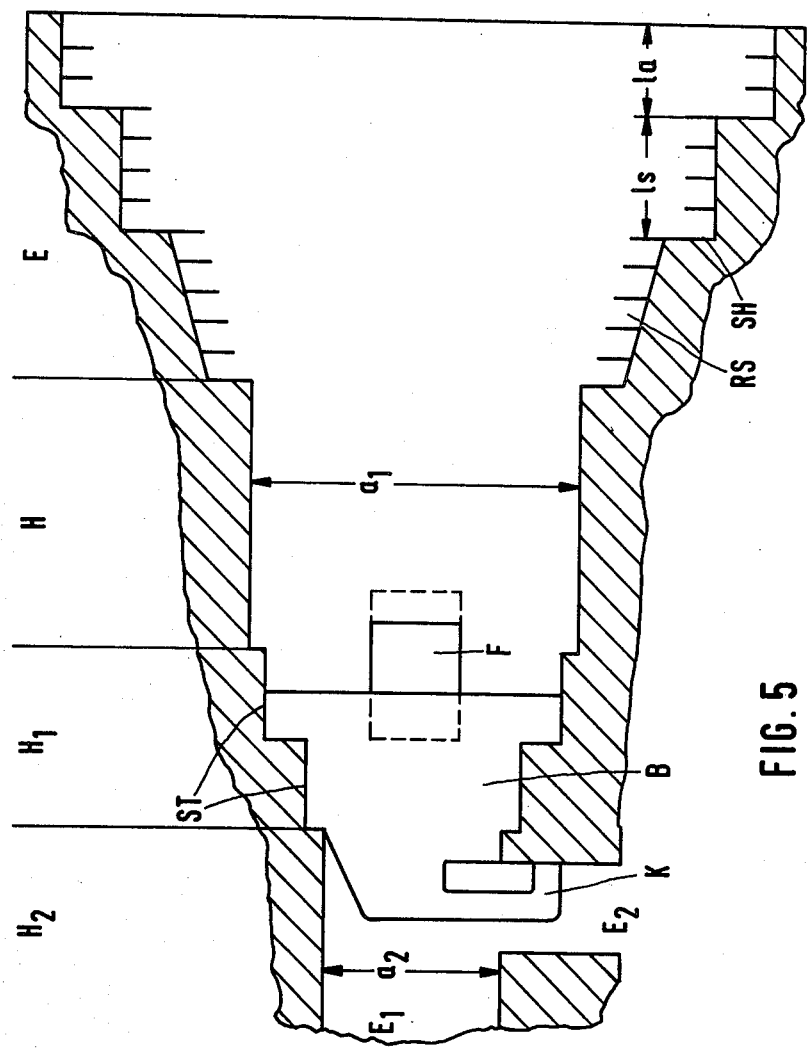

MICROWAVE TRANSMISSION DEVICE WITH MULTIMODE DIVERSITY COMBINED RECEPTION

BACKGROUND OF THE INVENTION

The present invention relates to a microwave transmission system for multipath transmission operating according to the angle diversity principle and more particularly to an improved exciter and mode coupler for such a system.

German Patent No. 2,626,925, issued Jan. 8, 1981, discloses a method which reduces the effects of statistical fluctuations in propagation on microwave transmission paths in that, in order to obtain angle diversity signals, the received energy of more than one mode is coupled in the waveguide-fed receiving antenna. This method is based on the fact that during a very large percentage of the transmission duration, at least one mode furnishes an evaluatable received signal. With this known method, it is possible to construct, for example with a single receiving antenna, a double angle diversity system which feeds the two received signals obtained from the different modes to separate receivers and derives therefrom the best signal.

It is also possible to employ a plurality of antennas or a plurality of exciters in one antenna for multipath transmission processes. This type of arrangement, however, is very complicated and, if a plurality of exciters are used in our antenna, leads to difficulties in the transmission of the transmitted signal because the spread angle between the individual radiation lobes is much too large, for example for troposcatter transmission.

SUMMARY OF THE INVENTION

It is therefore the object of the present invention to provide a microwave transmission system for multipath propagation which operates according to the angle diversity principle, manages with but a single antenna and one exciter and makes it possible to realize a multiplication of mutually independent transmission paths with an increased antenna gain in all participating radiation lobes so as to obtain a more effective combination of received signals into one best signal than has previously been possible. Transmitting and receiving operation should then be possible in a simple manner, i.e. without additional circulators, and simultaneously over this one antenna.

The above object is achieved according to the present invention in that in a microwave transmission system for multipath propagation operating according to the angle diversity principle comprising a transmitting and receiving device having a reflector antenna with a waveguide feeder system, including an exciter horn, wherein a fundamental mode and modes of a higher order can propagate, a mode coupler means connected to the output of the exciter horn for separating the energy components of the main mode and the higher order modes and for providing the separated energy components at respective outputs, and receiving and combining means, connected to the outputs of the mode coupler means, for obtaining the best signal from the received energy components of the various modes; the improvement is provided wherein: the waveguide exciter horn is dimensioned so that at least two independent modes of a higher order or combinations thereof having the same polarization as the main mode can be excited therein in addition to the main mode; in order to enlarge the radiation gain of the antenna, the waveguide exciter horn includes means for matching the aperture angle ($\alpha$) of the radiation lobe of the fundamental mode to the aperture angle ($\beta$) of the radiation lobes of the higher modes in the plane of the electrical field as well as in the plane of the magnetic field; the mode coupler means feeds more than two mutually independent received signals from the received energy components of the different modes separately to the receiving and combining means; and the mode coupler means includes a transmitting port which excites one mode therein whose preferred field direction is orthogonal to the preferred field direction of the received main mode.

According to further features of the invention, the means for matching includes steps in the interior dimensions of the exciter horn, corrugation grooves in the interior of the exciter horn, and/or a plurality of partitions disposed in the exciter horn for symmetrically subdividing the exciter horn into a plurality of chambers.

According to a preferred embodiment of the invention, the exciter horn has a rectangular cross section and the mode coupler means includes: a first rectangular waveguide section connected to the exciter horn, with the first rectangular waveguide section having its broad side oriented in the H plane of a received field vector and a cross section which does not permit the $H_{02}$ mode to exist; a second rectangular waveguide section connected axially to the first rectangular waveguide section; means for broadbandedly coupling the $H_{01}$ and $H_{20}$ modes in or out of the rectangular waveguide sections including a pair of axially oriented coupling windows symmetrically disposed in the opposite broad sides of the rectangular waveguide sections, and a partition symmetrically disposed in the second waveguide section parallel to the broad sides of the rectangular waveguide sections and having its edge facing the exciter horn ending at the coupling windows; and a magic-T symmetrically connected to the coupling windows to seperate energy components of the $H_{01}$ and $H_{20}$ modes energy coupled out by the coupling windows so as to provide same at seperate ports.

According to a further feature of the invention, in orthogonal transmitting and receiving operation, the feeder system is installed in the reflector with a shift of 45° with respect to the horizontal direction so that the polarization direction of the excited modes is shifted by 45° with respect to the horizontal direction.

Finally, according to a further embodiment of the invention the feeder system includes four waveguide sections directly following the exciter horn, and the mode coupler means includes four magic-T branches connected to these four waveguide sections such that the $H_{21}+E_{21}$ mode, in addition to the $H_{10}$, $H_{11}+E_{11}$ and $H_{20}$ modes are provided at their outputs.

BRIEF DESCRIPTION OF THE DRAWINGS

FIG. 2a shows the field lines for the $H_{10}$ and $H_{20}$ modes in a rectangular waveguide.

FIG. 2b shows the radiation lobes belonging to the $H_{10}$ and $H_{20}$ modes in the azimuth plane.

FIG. 2c shows the field lines for the $H_{11}$ and $E_{11}$ modes and the associated sum field $(H_{11}+E_{11})$ in a rectangular waveguide.

FIG. 2d shows the radiation lobes belonging to the $H_{10}$ mode and to the $(H_{11}+E_{11})$ mode in the elevational plane.

FIG. 4 is a perspective view, partly broken away, of a mode coupler M with an exciter horn E and a subreflector SR according to a preferred embodiment of the invention.

FIG. 5 is a sectional view in the H plane through the waveguide sections H, $H_1$, $H_2$ and through the exciter horn E of FIG. 4.

DETAILED DESCRIPTION OF THE PREFERRED EMBODIMENTS

Figure 1A:
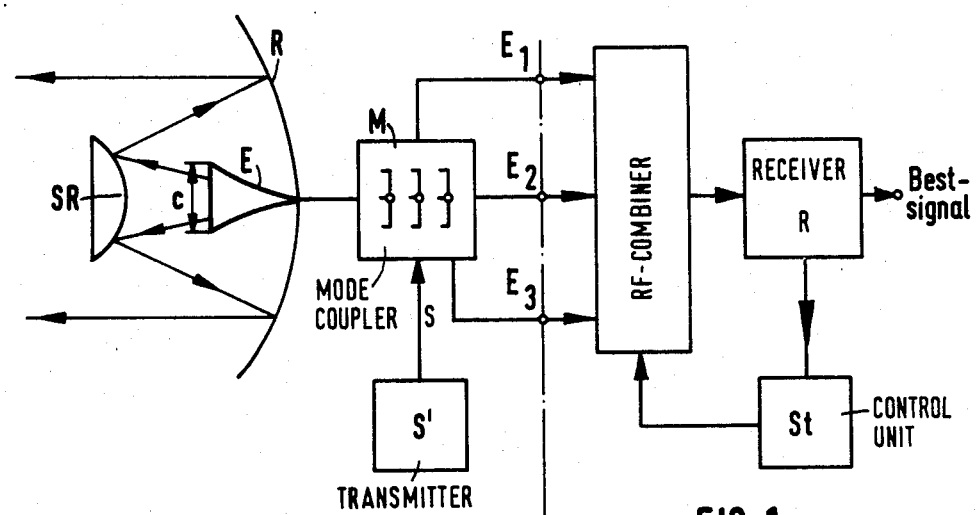
FIG. 1a is a block circuit diagram of an end station of a radio transmission system operating with mode diversity, utilizing a high frequency (RF) combiner.

Referring now to FIG. 1a, as shown the preferred antenna system is a Cassegrain system which comprises a main reflector R, a subreflector SR and an exciter horn E. The effective focal length of this type of reflector is generally greater than in an antenna of the focusfed type. The result is that the exciter aperture c must be selected to be comparatively larger which enhances the chances for existence of the higher waveguide modes. The subsequently connected mode coupler M separates the energy component of different modes of the exciter horn E and furnishes, for example, three receiving outputs $E_1$, $E_2$, $E_3$ and one transmitting input S connected to a transmitter S'. The transmitting input S may be associated with the mode of one receiving output.

As shown in FIG. 1a, the three receiving outputs $E_1$, $E_2$, $E_3$ may feed a high frequency (RF) combiner which is controlled by the receiver R, via a control unit St, so that a high frequency best signal is made available at the ouput of the RF combiner and is offered to the receiver R.

The RF combiner may be designed in a known manner, for example as disclosed in the article by Ulrich H. Sysel, "Elektronisches Raumdiversity System für Richtfunkanlagen" [Electronic Space Diversity System for Radio Systems], NTG-Fachbericht, Volume 70, page 199.

Figure 1B:
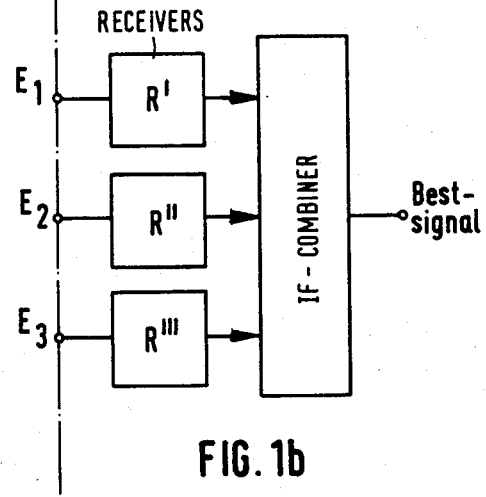
FIG. 1b is a block circuit diagram showing a modification of the end station of FIG. 1a, wherein an intermediate frequency or base band combiner is used instead of the radio frequency combiner.

Another RF-combiner is known from a script of © 1979 General Electric Company Limited England BR21A5mA979 "11 GHz Digital Radio Systems":

Alternatively, as shown in FIG. 1b, an intermediate frequency (IF) or a so-called base-band combiner can also be used, which is supplied by three separate receivers R', R'', R'''. Such an arrangement is described in the prospectus from Motorola Inc. entitled "MVEC-70 PREDETECTION COMBINER".

In addition to these general features, individual groups of this mode diversity process will now be described as, in their design according to the present invention, they provide a particularly high transmission quality.

Of first importance is the antenna system. Listed below are the modes which, with a given exciter shape, produce independent angle diversity diagrams.

(a) rectangular exciter: (pyramid horn with or without a corrugated groove structure)

In such an exciter the $H_{10}$ mode is suitable as the main lobe and the $H_{20}$ mode as the angle diversity lobe (see German Patent No. 2,626,925).

The $H_{10}$ mode can simultaneously serve as the carrier of the transmitted signal. With vertical polarization of the transmitter at the other end of the system the field configuration shown in FIG. 2a results in the exciter aperture c and the shape of the antenna lobes derived therefrom is shown in FIG. 2b.

In addition to this known double mode diversity method, according to the invention, a triple diversity system is now produced in that two further modes ($H_{11}$ and $E_{11}$ modes) are used and are combined with one another in such a manner that a spread lobe, which is likewise vertically polarized over a broad frequency range, is produced in the elevational plane of the exciter. The field combination $(H_{11}+E_{11})$ is shown in FIG. 2c, the associated radiation lobes are shown in FIG. 2d.

In the case of a rectangular corrugated exciter, the $HE_{11}$ mode takes the place of the $H_{10}$ mode, the $HE_{21}$ mode takes the place of the $H_{20}$ mode, the $HE_{12}$ mode takes the place of the $H_{11}+E_{11}$ mode.

The use of a combination of two modes for the vertically spread lobe ($H_{11}+E_{11}$ mode) is no drawback in practice since both modes have the same propagation constants in the waveguide and thus the field state of the aperture c remains the same during propagation along the horn.

Figure 3A:
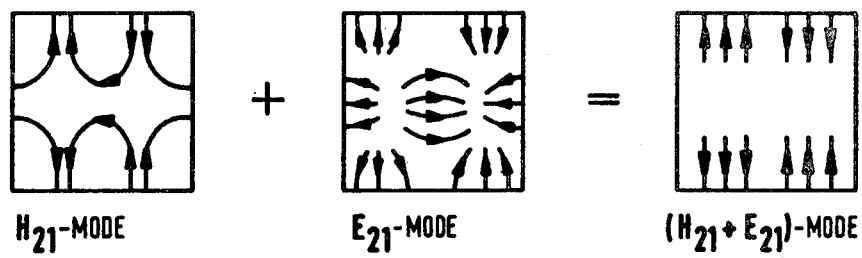
FIG. 3a shows the field lines for the $H_{21}$ and $E_{21}$ modes and the associated sum field $(H_{21}+E_{21})$ in a rectangular waveguide.

For rectangular exciters it is possible to generate a fourth diversity lobe which results from a combination of the $H_{21}$ and $E_{21}$ modes. This field configuration is shown in FIG. 3a.

Figure 3B:
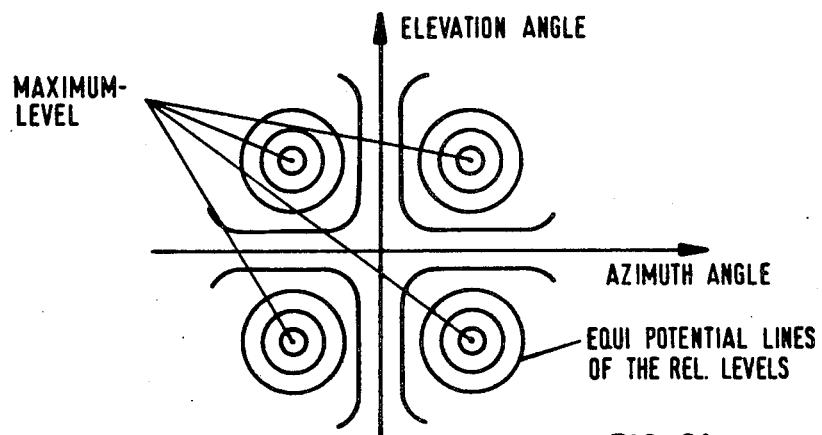
FIG. 3b is a schematic representation of the radiation lobe configuration of the sum field $H_{21}+E_{21}$ as a group of equal gain contours.

FIG. 3b is a schematic representation of the associated lobe configuration as groups of equal gain contours. This lobe configuration is spread in the azimuth plane as well as in the elevational plane and has four identically sized field intensity maxima. All four individual lobes have the same maximum gain. In the case of a corrugated exciter, the $HE_{22}$ mode takes the place of the $H_{21}$ and $E_{21}$ modes.

(b) Circular exciter: (Concial horn with smooth or corrugated surface)

With a circular exciter it is more difficult to generate two diversity lobes over a broad band (spread lobes) which have the same polarization as the main lobe since for this purpose each spread lobe would have to be produced from two modes having different propagation constants.

The descriptions below of feeder systems according to the present invention are therefore based on rectangular exciter cross sections.

FIG. 4 is a perspective view of the design of a feeder system for multimode diversity combined reception according to the invention including an exciter E, a subreflector SR and a mode coupler M. The mode coupler M has a total of four waveguide ports, $E_1$, $E_2$, $E_3$, and S, of which three, $E_1$, $E_2$, $E_3$, can be utilized for mode diversity combined reception, while the fourth port S can be utilized as a transmitting input. The output port $E_1$ is coupled to the $H_{10}$ mode, the output port $E_2$ is coupled to the $H_{11}+E_{11}$ mode and the ouput port $E_3$ is coupled to the $H_{20}$ mode. The input port S transmits the orthogonal polarization ($H_{01}$ mode). The utilization of the port S as the transmitting input constitutes an elegant possibility for separating transmission and reception. By decoupling the modes from one another, all receiving ports are decoupled from the transmitting port. But this measure makes it absolutely necessary to install the feeder system in the reflector on the antenna at the opposite end of the system with an axial shift of 90°. Particularly favorable results are obtained if the feeder systems of both of the communicating antennas are arranged under an angle of 45° with the horizontal or vertical plane, respectively (but shifted by 90° with respect to one another). When the feeder systems are then installed in the respective antennas, the installation position of other antennas need no longer be considered. If the exciter systems of the commicating antennas are installed identically, the 90° shift of the vectors is produced automatically because during operation the antennas are oriented toward one another. The axial shift of the vector planes brings about another advantage with respect to the spread lobes. If the antenna is oriented in such a manner—which is frequently the case—that the main lobe is raised only slightly above the horizon, with a non-shifted installion position the lower lobe half of the vertical spread lobe would be pointed toward the ground and would loose a major portion of its receiving gain.

With a 45° shift in the installation position, the spread angle with respect to the vertical plane is reduced by the factor $1/\sqrt{2}$, so that with the same alignment angle of the antenna, a greater receiving gain can be expected in the previously spread diversity lobe. However, this measure also rotates the previously horizontally oriented spread lobe by 45° so that now the same conditions can be expected in both spread lobes (as a result of the antenna orientation).

Following these basic comments, the design of the mode coupler M (FIG. 4) will now be discussed in greater detail.

The rectangular cross section exciter horn E is followed by the initial waveguide section of the mode coupler M which is a rectangular waveguide section H in which all modes to be evaluated must be able to exist. This section H is then followed sequentially by rectangular waveguide sections $H_1$ and $H_2$.

To couple the energy components of the $H_{01}$ and of the $H_{20}$ modes into and/or out of the waveguide sections H and $H_1$ of the mode coupler M, a pair of axially oriented identical waveguide windows F (only one of which is shown) are symmetrically disposed in the upper and lower walls of these waveguide sections so that they face one another. The $H_{01}$ and the $H_{20}$ modes coupled in and/or out are transmitted via symmetrical waveguides branches $L_1$, $L_2$ to a magic-T branch T wherein they are separated so that the energy of the $H_{01}$ and $H_{20}$ modes are present at the ports S and $E_3$, respectively. Symmetrically arranged in the waveguide sections $H_1$, $H_2$ is a partition sheet B. As best shown in FIG. 5, the front edge of the partition B, i.e. the edge facing the exciter horn E, ends at the rear edge of the coupling windows F. The partition B prevents propagation of the $H_{01}$ mode into the rear section $H_2$ of the mode coupler M. Simultaneously the position of the sheet B along the axis of the mode coupler M is of decisive significance for the attainable matching when coupling in the $H_{01}$ mode. The partition B serves a further purpose in that it converts the $H_{11}+E_{11}$ mode coming from the exciter into two opposite-phase waveguide modes whose energy is then selectively coupled by means of a coupling bar K connected to the rear of the partition sheet B (FIG. 5) into a waveguide section which extends laterally from the section $H_2$ and forms the port $E_2$. Along the longitudinal axis of the mode coupler M, the $H_{10}$ mode moves relatively uninterfered-with into the rear ouput port $E_1$. The interior design of the feeder system is more clearly shown in FIG. 5 which is a sectional view in the H plane through the waveguide sections H, $H_1$, $H_2$ and through the exciter horn E.

The front waveguide section H is assumed to have the width $a_1$ and the height $b_1$. The width or broadside of the waveguide section H lie in the H plane of the received field vector and is such as to permit the $H_{20}$ mode to exist in the waveguide section H. However, the height $b_1$ of waveguide section H is such that it does not permit the existence of the $H_{02}$ mode, but does permit the existence of the $H_{01}$ mode. At approximately the position of the coupling windows F along the axis of the mode coupler M, the width $a_1$ is reduced, either in stages ST as shown in FIG. 5 or continuously, to the value $a_2$ in the waveguide section $H_2$. This reduction in width together with an additional reduction of the waveguide height from $b_1$ to $b_2$ permits only the existence of the $H_{10}$ mode at the port $E_1$. In the case where all described modes are employed, care must be taken that the waveguide height $b_1$ is selected large enough so that in addition to the $H_{01}$ mode to be transmitted, the $H_{11}+E_{11}$ mode also can exist up to the partition B. In a possible, simplified embodiment of the mode coupler M which requires no use of the $H_{01}$ mode, the partition B can be axially advanced to the front waveguide H. In that case, however, a signal to be transmitted must be transmitted through port $E_1$ ($H_{10}$ mode) in addition to the received signal, which is possible in a known manner by means of added ferrite circulators.

The design of the exciter horn E is of particular significance in a multimode diversity antenna. The exciter is decisively responsible for the realization of high antenna gains.

Measures will now be described which permit optimum gains for all participating modes. Classical measures (e.g. introduction of a corrugated exciter) makes gain optimization possible only for the orthogonally polarized fundamental modes $H_{10}$, $H_{01}$.

Figure 6:
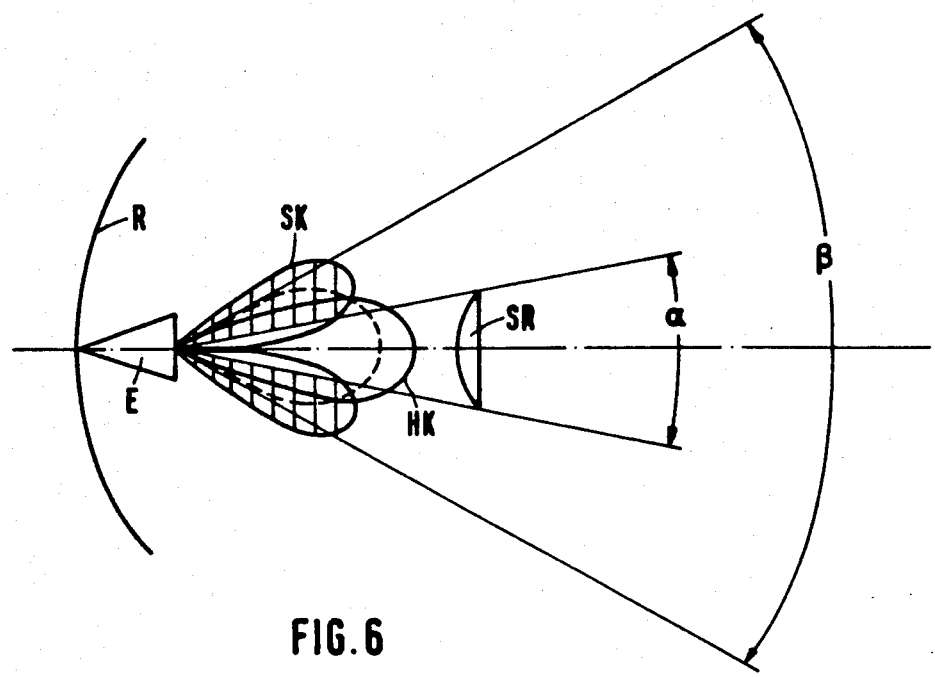
FIG. 6 is a diagram showing the illumination conditions of the $H_{10}$ and $H_{20}$ modes and the $(H_{11}+E_{11})$ mode, respectively, in the antenna.

In practice, the following illumination conditions, which are shown in FIG. 6, result for a main mode $H_{10}$ and a higher mode $H_{20}$ in the antenna. As shown, while a major portion of the primary lobe HK of the main mode $H_{10}$ formed by the exciter horn E impinges on the subreflector SR at the illumination angle range $\alpha$, the hatched region of the spread lobe SK ($H_{20}$ mode) remains outside the illumination zone and is thus lost for the antenna gain. In this case, the antenna gain is the gain normally to be expected for the main lobe, while a noticeable drop in gain appears for the spread lobe. In the classical case, it is possible to compromise between the two antenna lobes in that the illumination angle α is increased by a change in antenna geometry, and thus more energy of the spread lobe is utilized. But the additional measures according to the invention are intended to produce a further increase in the antenna gain without having to compromise. This is accomplished according to the invention in that the primary lobes $H_{10}$, $H_{01}$ belonging to the main modes are broadened (see dashed line) without making the spread lobes significantly narrower. After effecting the broadening, the antenna geometry must be matched again, i.e. the horn aperture or the subreflector is adapted to the new conditions.

When both fundmental modes $H_{10}$, $H_{01}$ are utilized, the introduction of a corrugated exciter horn E with corrugations RS (FIG. 5) is initially very advantageous (symmetrical radiation lobe shapes in the H and E planes). Additionally, the introduction of step-shaped increases in cross section SH or bends as shown in FIG. 5 causes the excitation of further hybdrid modes which produce the desired radiation lobe broadening in both utilized polarization planes of the exciter (here $HE_{11}$ modes). The excited modes to be mentioned here would be, in particular the $HE_{31}$ mode for the H plane or the $HE_{13}$ mode for the E plane, which in superposition with the $HE_{11}$ mode causes a field concentration in the center of the aperture of the exciter horn E if the phase position is suitable, and thus results in the desired broadening of the lobe.

Figure 7:
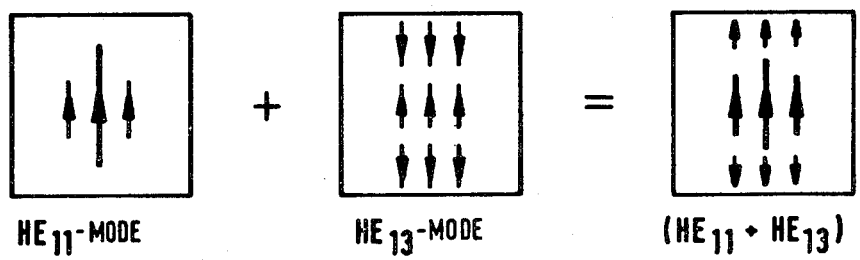
FIG. 7 shows the field lines of the $HE_{11}$ and $HE_{13}$ mode and its sum field $(HE_{11}+HE_{13})$ in a rectangular waveguide.

FIG. 7 shows these conditions for broadening in the E plane. The lengths $l_s$ of the steps or bend sections SH and their distance $l_a$ from the exciter aperture are selected in such a way that the phase position shown in FIG. 7 results. The cross-sectional structure of the exciter horn E is selected to be a square one in all horn sections if both polarizations of the main mode ($HE_{11}$) are utilized. The arrangement of a plurality of steps SH as shown in FIG. 5 makes the described effect broadbanded.

An interesting possibility to perform the above-described broadening of the main lobe in the exciter system with very simple means results if only one main mode $H_{10}$ is to be utilized in the antenna system. The corrugated structure RS in the exciter horn E is then not necessary. The measures for broadening the radiation lobes must then be performed differently in both major planes of the exciter horn E.

Figure 8A:
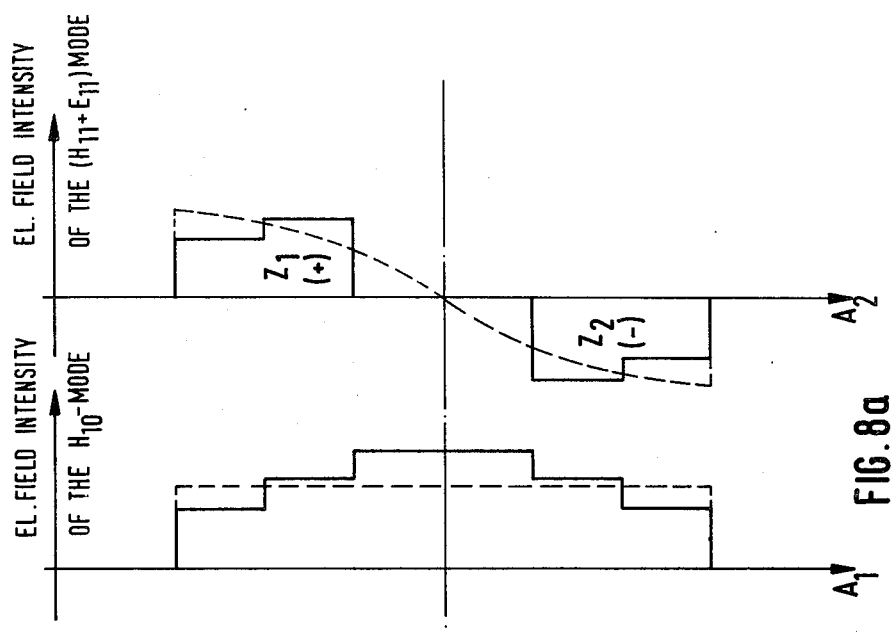
FIG. 8a shows the field distribution of the $H_{10}$ and the $(H_{11}+E_{11})$ modes in the aperture plane of the exciter horn E of FIG. 8.
Figure 8:
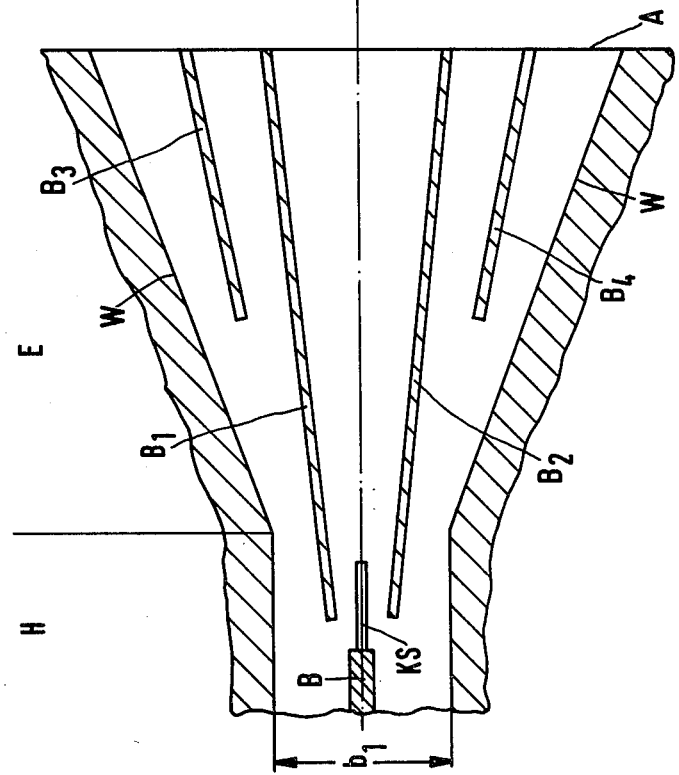
FIG. 8 is a sectional view in the E plane through the exciter horn E and a portion of the waveguide section H of FIG. 4.

The plane of the electrical fields as shown in FIG. 8 will first be considered. In principle, it is possible here as well to have bends, jumps etc. to obtain broadening of the lobe of the fundamental mode, but the introduction of partitions $B_1$, $B_2$, $B_3$, $B_4$ as shown in FIG. 8 results in a very simple way to conversely match the radiation lobes of the higher mode to the lobe of the main mode. Rotational symmetry is obtained by the selection of the side ratio of the rectangular aperture of the exciter horn E.

FIG. 8 is a sectional view of the end of the partition B (mode coupler) together with the interior structure of the rectangular of square exciter horn E. The exciter horn is subdivided symmetrically into chambers by the partitions $B_1$, $B_2$, $B_3$, $B_4$. This chamber horn is known per se but is modified for use with a plurality of modes in such a manner that the radiation lobe of the main mode is broadened in the E plane and the radiation lobe of the higher mode $H_{11}+E_{11}$ is made narrower. This is accomplished in that the inner chambers between partitions $B_1$ and $B_2$ are given such dimensions in their portions in the vicinity of the partition B that the $H_{11}+E_{11}$ mode emanating from the partition B cannot propagate. The $H_{10}$ modes emanating from waveguide section H are divided by the partitions $B_1$, $B_2$, $B_3$, $B_4$ as to their power according to the geometric dividing ratio and are transmitted in the waveguides formed between the respective partitions $B_1-B_4$. An $H_{10}$ wave is then produced between partitions $B_1$ and $B_2$. The slope of the partitions $B_1-B_4$ with respect to the inner walls W of the exciter horn E produces a field distribution in the aperture plane A which is changed with respect to the uninterfered-with conditions, i.e. with no partitions in the exciter horn E as plotted schematically along the axis $A_1$. The uninterfered-with distribution originally to be expected is shown in dashed lines. Compared to the formerly constant distribution, the field concentration is now greater in the center of the exciter horn E, which leads to broadening of the radiation lobe of the exciter horn. This measure is appropriate only if simultaneously the radiation lobe associated with the higher mode (or derived therefrom) retains its width or possibly can be made even narrower. This is accomplished by the field distribution of the partial modes emanating from the $H_{11}+E_{11}$ mode as plotted along the axis $A_2$. With the illustrated partition configuration there is produced a dead field area in the center zone. This presses the two opposite-phase field centers $Z_1$, $Z_2$ even further apart resulting in the radiation lobes becoming narrower. The reduction in field intensity toward the edge of the aperture A of the exciter horn E plays an important part in this reduction in width. In an exciter horn E without partitions, field intensity maxima occur along the edge and lead to very strong stray fields (diffraction, sheath currents) at the edge of the exciter horn E and therefore broaden the radiation lobes (field distribution shown in dashed lines). The transition of the $H_{11}+E_{11}$ mode into the waveguide section H having the partitions $B_1$ and $B_2$ produces a discontinuity (dead field area between partitions $B_1$ and $B_2$). The reflection caused thereby can be compensated, however, by an adjustable stub arrangement, e.g. in the form of an axially arranged conductive pin KS connected to the edge of the partition B. This pin KS, if it is sufficiently thin, has no damaging effect on the $H_{10}$ mode likewise to be transmitted.

In the H plane of the exciter, measures must also be taken to influence the width of the radiation lobes. But here no new imaging is required; reference can be made to the cross-sectional steps and bends in FIG. 5. However, the corrugated structure RS in the interior of the exciter horn E is not necessary. The steps SH in the cross section excite in particular the $H_{30}$ mode so that with a suitable phase position with respect to the field of the $H_{10}$ mode, a changed field distribution is created in the aperture A to result in broadening of the radiated lobe of the fundamental mode.

Finally, a completely differently designed feeder system can be provided which, in addition to the $H_{10}$, $H_{11}+E_{11}$ and $H_{20}$ modes, also permits the utilization of the $H_{21}+E_{21}$ mode.

Figure 9:
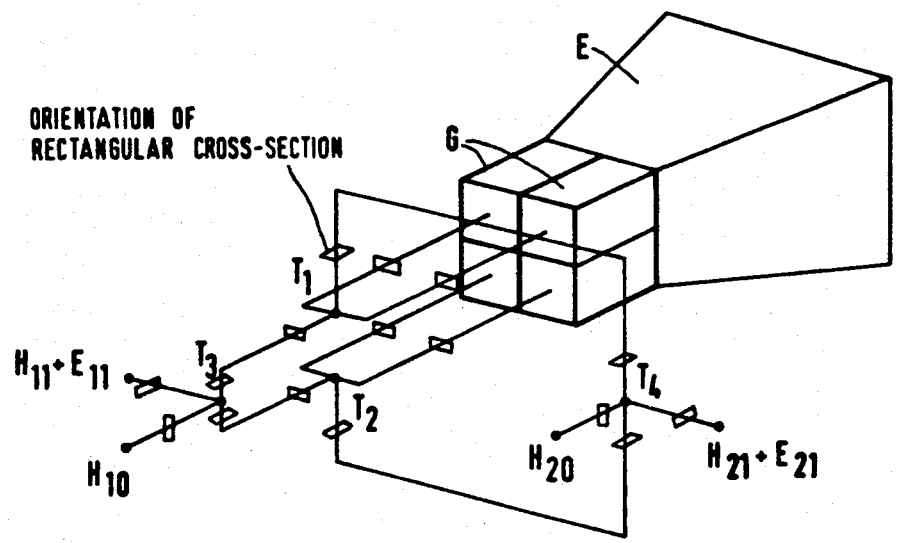
FIG. 9 is a schematic representation of an alternate arrangement according to the invention which permits, in addition to the $H_{10}$, $(H_{11}+E_{11})$ and $H_{20}$ modes, also the utilization of the $(H_{21}+E_{21})$ mode.

FIG. 9 shows such an arrangement which includes four rectangular waveguides G opening into the exciter horn E. The four waveguides G are connected together by magic-T sections $T_1$, $T_2$, $T_3$ and $T_4$ in the manner shown so that the energy of the various modes is available at their outputs.

The mode excitation depends on the phase relationships of the waves within the four waveguide openings G. If all four waves have equal phase, excitation of $H_{10}$ mode will result. The $H_{20}$-mode will be excited if the phase difference is 180 degrees between the waveguide openings arranged at the left and the right side. In the same manner excitation of $H_{11}+E_{11}$-mode will result if the phase difference is 180 degrees between the upper and the lower waveguide openings G. The $H_{12}+E_{12}$-mode will be excited if all adjacent waveguide openings have opposite phase (180 degrees). The four different phase relationships are produced by a waveguide branching network having four Magic T's included. This network can be fabricated from standard rectangular waveguide material as indicated in FIG. 9. The position of the H-plane and E-plane junctions can be easily taken from this Figure. The exciter horn may include the structural elements of the horn described in connection with FIG. 5.

It will be understood that the above description of the present invention is susceptible to various modifications, changes and adaptations, and the same are intended to be comprehended within the meaning and range of equivalents of the appended claims.

What is claimed is:

1. In a microwave transmission system for multipath propagation operating according to the angle diversity principle comprising a transmitting and receiving device having a reflector antenna with a waveguide feeder system, including an exciter horn, wherein a fundamental mode and modes of a higher order can propagate, a mode coupler means connected to the output of said exciter horn for separating the energy components of the fundamental mode and the higher order modes and for providing the separated energy components at respective outputs, and receiving and combining means, connected to said outputs of said mode coupler means, for obtaining the best signal from the received energy components of the various modes; the improvement wherein: said waveguide exciter horn is dimensioned so that at least two independent modes of a higher order or combinations thereof having the same polarization as said fundamental mode can be excited therein in addition to said fundamental mode; that, in order to enlarge the radiation gain of the antenna, said waveguide exciter horn includes means for matching the aperture angle ($\alpha$) of the radiation lobe of said main mode to the aperture angle ($\beta$) of the radiation lobes of said higher modes in the plane of the electrical field as well as in the plane of the magnetic field; said mode coupler means feeds more than two mutually independent received signals from the received energy components of the different modes separately to said receiving and combining means; and said mode coupler means includes a transmitting port which excites one mode therein whose preferred field direction is orthogonal to the preferred field direction of the received main mode.

2. A microwave transmission system as defined in claim 1 wherein said means for matching includes steps in the interior dimensions of said exciter horn.

3. A microwave transmission system as defined in claim 1 or 2 wherein said means for matching includes corrugation grooves in the interior of said exciter horn.

4. A microwave transmission system as defined in claim 1 or 2 wherein said means for matching includes a plurality of partitions disposed in said exciter horn for symmetrically subdividing said exciter horn into a plurality of chambers.

5. A microwave transmission system as defined in claim 1 wherein said exciter horn has a rectangular cross section and said mode coupler means includes: a first rectangular waveguide section connected to said exciter horn, said first rectangular waveguide section having its broad side oriented in the H plane of a received field vector and a cross section which does not permit the $H_{02}$ mode to exist; a second rectangular waveguide section connected axially to said first rectangular waveguide section; means for broadbandedly coupling the $H_{01}$ and $H_{20}$ mode's energy in or out of said rectangular waveguide sections including a pair of axially oriented coupling windows symmetrically disposed in the opposite broad sides of said rectangular waveguide sections, and a partition symmetrically disposed in said second waveguide section parallel to said broad sides of said rectangular waveguide sections and having its edge facing said exciter horn ending at said coupling windows; and a magic-T symmetrically connected to said coupling windows to seperate energy components of the $H_{01}$ and $H_{20}$ modes coupled out by said coupling windows so as to provide same at separate ports.

6. A microwave transmission system as defined in claim 1 wherein in orthogonal transmitting and receiving operation, said feeder system is installed in the reflector with a shift of 45° with respect to the horizontal direction so that the polarization direction of the excited modes is shifted by 45° with respect to the horizontal direction.

7. A microwave transmission system as defined in claim 1 wherein: said feeder system includes four waveguide sections directly following said exciter horn and said mode coupler means includes four magic-T branches connected to said four waveguide sections such that the $H_{21}+E_{21}$ mode, in addition to the $H_{10}$, $H_{11}+E_{11}$ and $H_{20}$ modes are provided at their outputs.

* * * * *